United States Patent [19]

Tanaka et al.

[11] Patent Number: 4,859,886
[45] Date of Patent: Aug. 22, 1989

[54] PORTABLE ENGINE-OPERATED ELECTRIC GENERATOR

[75] Inventors: Yoshio Tanaka; Shigeru Fujii; Takao Nishida; Yasushi Fujita, all of Saitama, Japan

[73] Assignee: Honda Giken Kogyo Kabushiki Kaisha, Tokyo, Japan

[21] Appl. No.: 20,370

[22] Filed: Mar. 2, 1987

[30] Foreign Application Priority Data

| Feb. 28, 1986 | [JP] | Japan | 61-44767 |
| Feb. 28, 1986 | [JP] | Japan | 61-44764 |
| Mar. 14, 1986 | [JP] | Japan | 61-37051[U] |
| Mar. 18, 1986 | [JP] | Japan | 61-39344[U] |

[51] Int. Cl.$^4$ .................. H02K 9/06; H02K 5/20; F02B 63/04
[52] U.S. Cl. .................. 310/51; 123/2; 290/1 B; 310/60 R; 310/67 R; 310/89
[58] Field of Search .................. 60/721; 123/2, 41.65, 123/198 E; 290/1 A, 1 B, 1 C; 310/51, 60 R, 64, 67 R; 322/1

[56] References Cited

U.S. PATENT DOCUMENTS

| 3,183,902 | 5/1965 | Wicklund | 123/41.65 |
| 3,259,752 | 7/1966 | Honda | 290/1 B |
| 4,548,164 | 10/1985 | Ylönen et al. | 123/2 |
| 4,595,841 | 6/1986 | Yaguchi | 290/1 A |
| 4,608,946 | 9/1986 | Tanaka et al. | 123/41.65 |
| 4,622,923 | 11/1986 | Nishimura et al. | 290/1 B |
| 4,647,835 | 3/1987 | Fujikawa et al. | 290/1 B |
| 4,677,940 | 7/1987 | Bracht et al. | 123/2 |
| 4,702,201 | 10/1987 | Odo et al. | 123/2 |

FOREIGN PATENT DOCUMENTS

| 53-3302 | 1/1978 | Japan . |
| 58-197417 | 11/1983 | Japan . |
| 59-17097 | 1/1984 | Japan . |
| 59-39933 | 3/1984 | Japan . |
| 59-87225 | 5/1984 | Japan . |
| 59-170596 | 9/1984 | Japan . |

Primary Examiner—Patrick R. Salce
Assistant Examiner—D. L. Rebsch
Attorney, Agent, or Firm—Irving M. Weiner; Joseph P. Carrier; Pamela S. Burt

[57] ABSTRACT

A portable engine-operated electric generator includes an engine having an output shaft and including heated and unheated components required for operation of the engine, a generator unit having an input shaft and drivable by the engine, the engine and the generator unit being vertically arranged, the output shaft of the engine and the input shaft of the generator unit being coupled to each other in axial alignment in a vertical direction, and a sound insulating case accommodating the engine and the generator unit and having a horizontal longitudinal axis. The heated and unheated components are separated from each other by, and located on opposite sides of, a plane lying in the vertical direction and in a direction normal to the horizontal longitudinal axis.

13 Claims, 7 Drawing Sheets

FIG.4 (III)

FIG.5(III)(a)

FIG.5(III)(b)

FIG.5(III)(c)

FIG.5(III)(d)

FIG.5(III)(e)

PORTABLE ENGINE-OPERATED ELECTRIC GENERATOR

BACKGROUND OF THE INVENTION

1. Field of the Invention:

The present invention relates to a portable engine-operated electric generator having a unitary combination of an engine unit and a generator unit driven thereby, and more particularly to an improvement in the arrangement of such an engine unit and generator unit.

2. Description of the Relevant Art:

Portable engine-operated generators are required to have good sound insulation for engine sounds, to be capable of efficiently radiating generated heat, and, most of all, to be of good portability. Attempts to meet the above requirements by positioning an engine unit and a generator unit side by side are disclosed in Japanese Laid-Open Utility Model Publication No. 53-3302, Japanese Laid-Open Patent Publications Nos. 59-17097, 59-87225, and 59-170596, U.S. Pat. Nos. 4,595,841 and 4,608,946, for example. In each of the conventional arrangements shown in the latter four publications, the engine unit is located centrally, and a muffler is positioned on the same side as the generator unit with a carburetor and an air cleaner disposed on the same side as a recoil starter in opposite relation to the muffler. With this structure, the components are separated into heated and unheated components for increased cooling efficiency and good maintainability. However, the cylinder block of the engine unit, which is a heated component, and the carburetor and the air cleaner, which are unheated components, are disposed closely to each other, and hence no complete isolation has been accomplished between these heated and unheated components.

Japanese Laid-Open Patent Publications Nos. 59-39933 and 59-39934 disclose a portable engine-operated generator in which the output shaft of an engine unit and the input shaft of a generator unit are coupled to each other in vertical coaxial alignment, so that the engine unit and the generator unit are vertically arranged to reduce their area of projection as viewed in plan as much as possible. According to these conventional configurations, however, the height of the overall generator is increased making it unstable in use, and a carburetor is located near an engine cylinder block, thus still failing to provide desired separation between the unheated and heated components.

SUMMARY OF THE INVENTION

According to an aspect of the present invention, there is provided a portable engine-operated electric generator comprising an engine having an output shaft, heated and unheated components required for operation of the engine, a generator unit having an input shaft and drivable by the engine, the generator unit disposed downwardly of the engine, the output shaft of the engine and the input shaft of the generator unit being coupled to each other in axial alignment in a vertical direction, and a sound insulating case accommodating the engine and the generator unit and having a horizontal longitudinal axis, the heated and unheated components being separated from each other by and located on opposite sides of a plane lying in the vertical direction and in a direction normal to the horizontal longitudinal axis.

According to another aspect of the present invention, there is also provided a portable engine-operated electric generator comprising an engine having an output shaft, a generator unit having an input shaft and drivable by the engine, the generator unit disposed downwardly of the engine, the output shaft of the engine and the input shaft of the generator unit extending and being coupled to each other in axial alignment in a vertical direction, a sound insulating case accommodating the engine and the generator unit and having an inner wall facing the engine and the generator unit, and an exhaust muffler connected to the engine and disposed between the engine and generator unit and the inner wall of the sound insulating case.

According to still another aspect of the present invention, there is provided a portable engine-operated electric generator comprising an engine having an output shaft, a generator unit drivable by the engine, the generator unit comprising an outer-rotor generator including a stator and a rotor including an outer cylindrical portion surrounding the stator, the rotor being supported on the output shaft of the engine at one end of the cylindrical portion remote from the engine, and a cooling fan disposed between the engine and the generator, the cooling fan having a plurality of fins supported on an end of the cylindrical portion and having raised surfaces extending radially inwardly from the cylindrical portion and at an angle to a plane of rotation of the rotor.

According to a further aspect of the present invention, there is provided a portable engine-operated electric generator comprising an engine having an output shaft, a generator unit having an input shaft and drivable by the engine, the output shaft of the engine and the input shaft of the generator unit having one axis, a cooling fan disposed between the engine and the generator unit, the cooling fan having a center of rotation on the axis and including an air guide, the air guide comprising a cylindrical main portion supported on the axis, an air outlet portion displaced from the main portion along the axis and opening tangentially to the main portion, and an air guide portion communicating between the air output portion and the main portion, the air guide portion being of a spiral shape.

It is an object of the present invention to provide a portable engine-operated electric generator which has a good heat radiating efficiency, can easily be maintained and serviced, and is small in size and light in weight.

Another object of the present invention is to provide a portable engine-operated electric generator which has a low center of gravity and a compact configuration with heavy components located in a lower portion of the generator.

Still another object of the present invention is to provide a portable engine-operated electric generator in which a cooling fan can quite simply be attached in position between an engine unit and an outer-rotor generator unit for efficiently cooling the engine unit and the rotor of the generator unit.

A further object of the present invention is to provide a portable engine-operated electric generator having a cooling air guide disposed around a cooling fan, the cooling air guide having a good weight balance and a good air guiding efficiency.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 4(II) is a schematic plan view of another arrangement in which an engine assembly and a muffler are coupled to each other;

FIG. 4(III) is a schematic side elevational view showing alternative positions of a muffler with respect to an engine assembly;

FIG. 5(II)(a,b,c) show various structures by which air directors are attached to cooling fan fins;

FIG. 5(III)(a,b,c,d,e) illustrate various structures by which cooling fan fins are attached to rotors;

DETAILED DESCRIPTION OF THE PREFERRED EMBODIMENTS

Like or corresponding parts are denoted by like or corresponding reference characters throughout the views.

Figure 1:
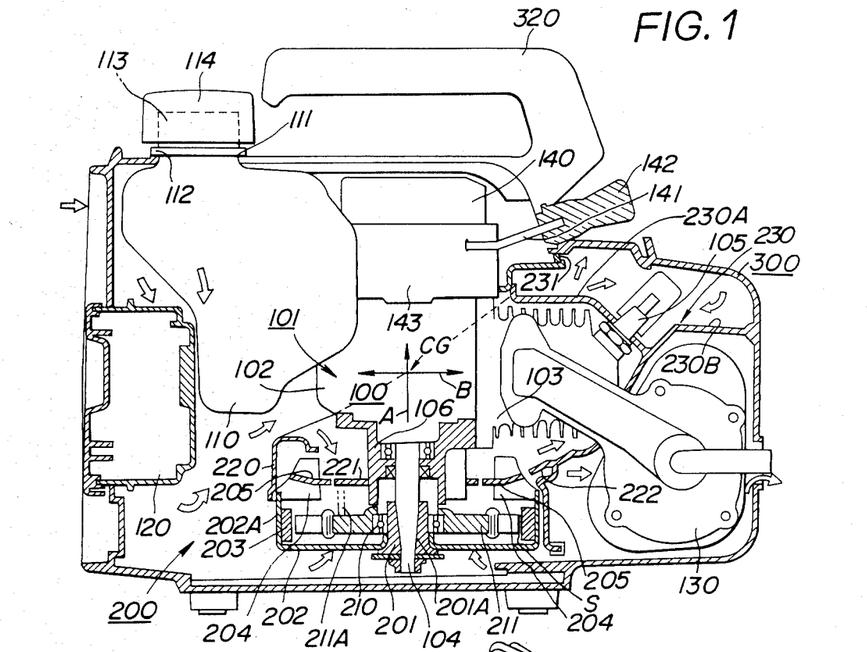
FIG. 1 is a side elevational view of a portable engine-operated electric generator, with a generator unit and a cover case being shown in cross section.

As shown in FIG. 1, a portable engine-operated electric generator mainly comprises an engine unit 100, a generator unit 200, and a sound insulating cover case 300.

The engine unit 100 has an engine assembly 101 comprising a crankcase 102, a cylinder block 103, a crankshaft 104 extending downwardly from the crankcase 102, and a spark plug 105. The engine unit 100 also includes a fuel tank 110 and an air cleaner unit 120 that are disposed on the lefthand side of the engine assembly 101, a muffler unit 130 positioned on the righthand side of the engine assembly 101, and a recoil starter unit 140 disposed on the upper portion of the crankcase 102. The crankcase 102 and the cylinder block 103 are horizontally arranged side by side, with the crankshaft 104 being directed as the engine output shaft vertically from the crankcase 102. Therefore, as fuel is burned in the cylinder block 103, a piston (not shown) is reciprocally moved horizontally to rotate the crankshaft 104 about its vertical axis.

The fuel tank 110 is a unitary component molded of synthetic resin, for example. The fuel tank 110 has a fuel inlet 111 including a flange 112, and is supported in the cover case 300 with the flange 112 held against the upper surface of the cover case 300. The fuel inlet 111 includes a mouth 113 projecting upwardly from the upper surface of the cover case 300 with a cap 114 placed on the mouth 113. Therefore, fuel can be poured into the fuel tank 110 by removing the cap 114.

Figures 2A, 2B:
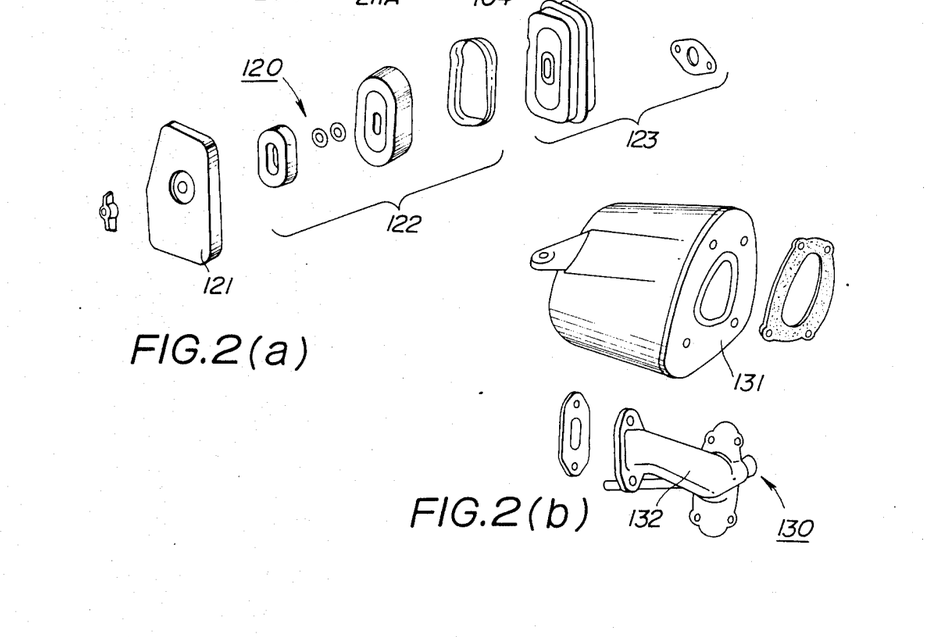
FIG. 2(a) is an exploded perspective view of an air cleaner unit.
FIG. 2(b) is an exploded perspective view of a muffler unit.

As shown in FIG. 2(a), the cleaner unit 120 comprises a cover plate 121 for fixing the cleaner unit 120 to the cover case 300, a cleaner element 122, and a cleaner case 123 attached to the intake manifold of the engine assembly 101.

As illustrated in FIG. 2(b), the muffler unit 130 includes a muffler 131 and an exhaust manifold 132 interconnecting the exhaust port of the engine assembly 101 and the muffler 131.

Figure 3:
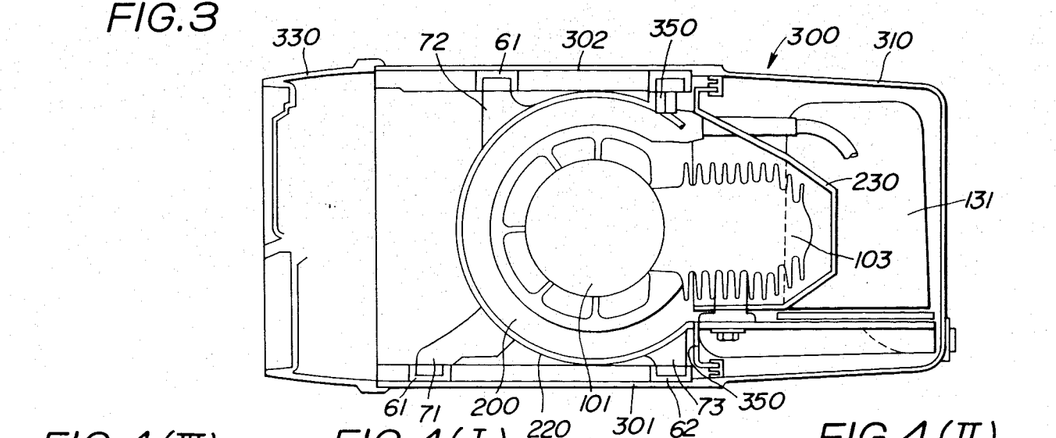
FIG. 3 is schematic plan view showing the positional relationship of an engine assembly, a generator unit, and a muffler, with an upper cover case portion omitted from illustration.

FIG. 3 shows the portable engine-operated electric generator in plan. It is clearly shown in FIGS. 1 and 3 that the muffler 131 extends perpendicularly to the crankshaft 104 and is positioned obliquely downwardly of the cylinder block 103 and laterally of the generator unit 200.

Figure 4:
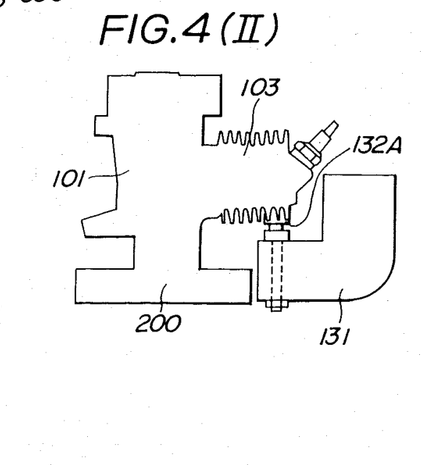
Figure 4I:
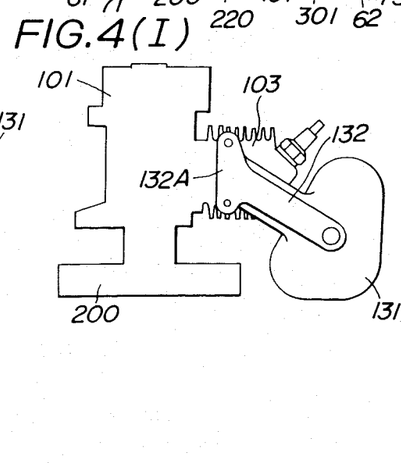
FIG. 4(I) is a schematic side elevational view of an arrangement in which an engine assembly and a muffler are coupled to each other.

FIGS. 4(I) through 4(III) schematically illustrate different arrangements, each showing the positional relationship between the engine assembly 101 and the muffler 131. In FIG. 4(I), the muffler 131 is disposed obliquely downwardly of the cylinder block 103, and the exhaust port 132A of the engine assembly 101 and the muffler 131 are interconnected by the exhaust manifold 132 on one side of the cylinder block 103. Thus, FIG. 4(I) shows in side elevation the same positional relationship as that shown in FIGS. 1 and 3. FIG. 4(II) is a side elevational view of another structure in which an engine exhaust port 132A is joined directly to the muffler 131 disposed below the cylinder block 103, with the exhaust manifold 132 of FIG. 4(I) being omitted. The muffler 131 may freely be oriented with respect to the cylinder block 103 as indicated by the solid and imaginary lines in the plan view of FIG. 4(III). In any case, the muffler 131 is located below the cylinder block 103 for better weight balancing or profile balancing.

Referring back to FIG. 1, the generator unit 200 disposed underneath the engine assembly 101 includes a rotor shaft 201 as the input shaft thereof, to which the crankshaft 104 is joined. The recoil starter unit 140 has a rotatable shaft coupled to the crankshaft 104. The recoil starter unit 140 has a wound cord 141 with a knob 142 joined to its end. The engine assembly 101 can be started by pulling the cord 141, with the knob 142 gripped by the operator, out of a case 143 of the recoil starter.

Figure 5:
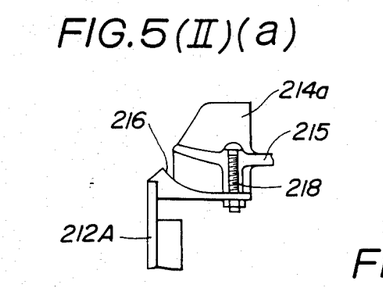
FIG. 5(I) is an exploded perspective view of the generator unit.
Figure 5I:
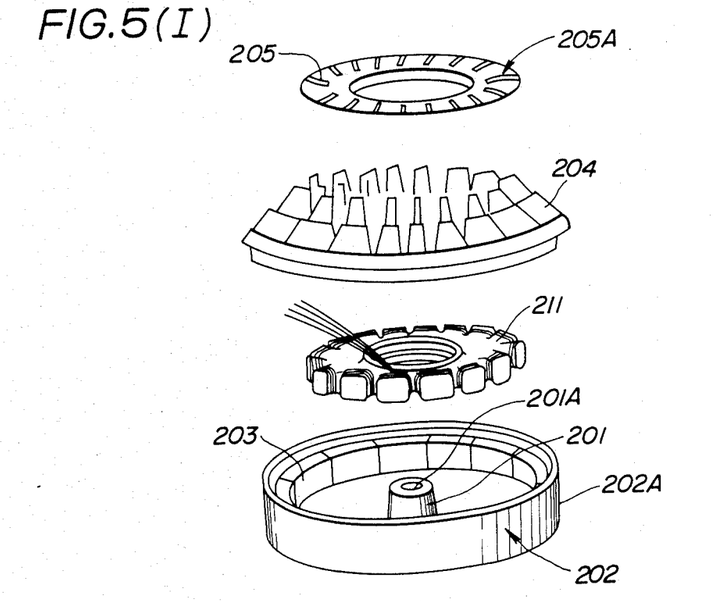

Referring to FIGS. 1 and 5(I), a cooling fan 204 is disposed on an upper edge of the outer cylindrical portion 202A of a rotor disc 202. The cooling fan 204 has a plurality of radial vanes or fins directed radially outwardly from a common center which is substantially aligned with the central axis A of rotation of the rotor shaft 201. An air director 205 is mounted on the cooling fan 204 and divides the fins into upper and lower portions for efficiently drawing cooling air from the engine assembly 101 and a stator winding 211. The air director 205 may be mounted on the cooling fan 204 by inserting and engaging the fins of the cooling fan 204 in respective slits defined in the air director 205. Therefore, the slits of the air director 205 are shaped complementarily to the fins of the cooling fan 204. The air director 205 may be dispensed with if the amount of air introduced from the engine assembly 101 and the amount of air introduced from the stator winding 211 would be well balanced in the absence of the air director 205.

FIG. 5(II) shows various different embodiments of the cooling fan illustrated in FIG. 5(I). In FIG. 5(II) at (a), each fin 214a and an air director 215 are of a unitary construction, and mounted on the upper edge of an outer cylindrical portion 212A of the rotor disc through a seat 216, the seat 216 and the air director 215 being secured to each other by a bolt. In FIG. 5(II) at (b), each fin 224a and a seat 226 are of a unitary construction, and an air director 225 engages a projection 227 of the seat 226. In FIG. 5(II) at (c), a first fin 234a has a seat 236, and a second fin 234b is connected to an air director 235, the second fin 234b being placed over the first fin 234a in a double-stack configuration.

FIG. 5(III) shows various structures in which cooling fans are attached to rotors. In FIG. 5(III) at (a), a cooling fan is fixed to a rotor by a bolt 247 extending through a field magnet 243 between a seat 246 of a fin 244a and a rotor plate 242. In FIG. 5(III) at (b), a seat 256 of each fin 254a is fixed by a bolt 257 to the upper edge of an outer cylindrical portion 252A of a rotor plate. In FIG. 5(III) at (c), an outer cylindrical portion 262A of a rotor plate has a hole 262a defined in an upper edge thereof, and a projecting engaging portion 266a of a seat 266 of a fin 264a is fitted in the hole 262a. The upper edge of the outer cylindrical portion 262A also has an engaging portion 262b fitted in a groove 266b defined in the seat 266. In FIG. 5(III) at (d), an air director 275 has an engaging portion 275a engaging in a hole 272b defined in an upper edge of an outer cylindrical portion 272A. In FIG. 5(III) at (e), an engaging portion 286a on a base 286 of a fin 284a engages in a groove 282a defined in an outer cylindrical portion 282A.

As shown in FIG. 1, the stator winding 211 is mounted on the rotor shaft 201 through a ball bearing 210. To allow only the rotor to rotate, a stopper 211A for preventing the stator from rotating is disposed on a fixed member such as a crankshaft cover 106 secured to the crankcase 102. Because of the stopper 211A, the stator winding 211 only needs to be mounted on the rotor shaft 201 or the rotor disc 202 simply through the ball bearing 210. Therefore, the stator winding 211 can easily be installed in position, and the air gap S between the stator winding 211 and a cooperating plurality of rotor field magnets 203 which are arrayed on the inner surface on the outer cylindrical portion 202A of the rotor disk 202, can be easily made more accurate than it would be if the stator winding 211 were mounted on another fixed member such as the crankcase 102. With the stator winding 211 disposed radially inwardly of the rotor field magnets, there is provided a synchronous electric generator with an outer rotor and a revolving magnetic field. Since the armature winding can be wound in an axially elongate pattern, the number of turns of the armature winding can be increased by using thin coils. The number of magnetic poles is increased inasmuch as the field magnets are disposed in the peripheral portion of the rotor. Accordingly, a low-profile electric generator capable of generating a large output voltage can be provided. The field magnet rotor of a relatively large weight serves as a flywheel of the engine, allowing the engine to rotate stably and the generator to produce a stable output voltage. The output voltage from the generator is rectified by a three-phase full-wave rectifier circuit, and the rectified voltage is thereafter converted to an AC voltage of a prescribed frequency by a voltage stabilizing circuit and an inverter. Such electric circuits for producing such a desired AC voltage are provided in the portable engine-operated electric generator.

Cooling air guides 220, 221 are disposed above the outer cylindrical portion 202A and on the crankshaft cover 106, respectively, and cooperate with the air director 205 on the fins 204a of the cooling fan 204 in defining the two passages for air flowing from the engine assembly 101 and the stator winding 211. The guides 220, 221 and partitions 230, 231 (described later) are effective in separating cooling air for the cylinder block 103 and the muffler unit 130. The guide 220 serves to direct cooling air toward the cylinder block 103 and has a spiral shape with its height progressively increasing for better air flow efficiency, as described below with reference to FIGS. 6(a) through 6(c).

Figures 6A, 6C:
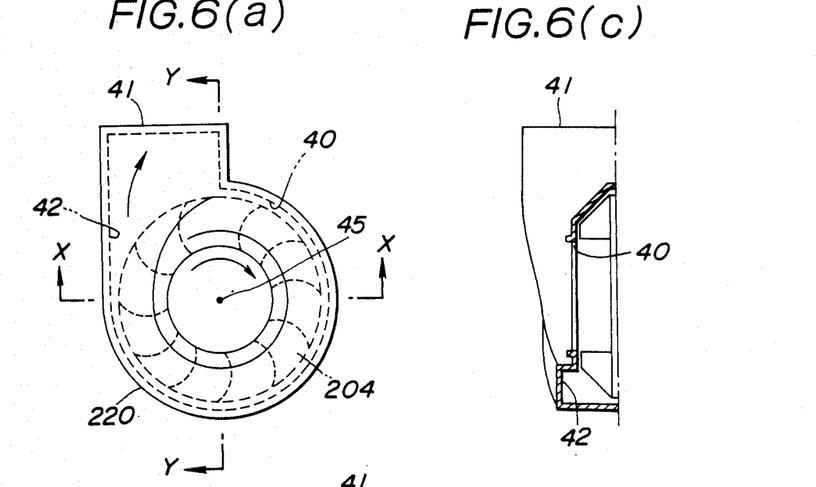
FIG. 6(a) is a horizontal cross-sectional view of a cooling air guide.
FIGS. 6(b) and 6(c) are cross-sectional views taken along lines X—X and Y—Y, respectively, of FIG. 6(a)
Figure 6B:
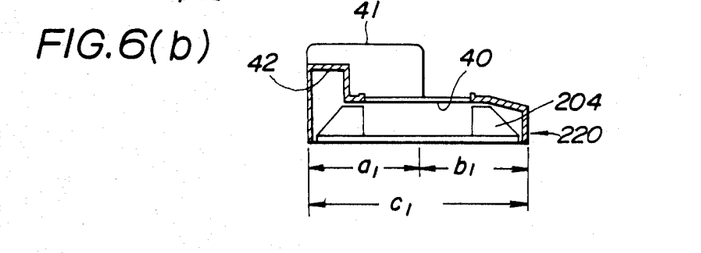
Figure 7A:
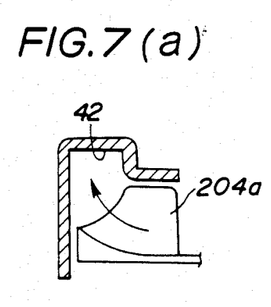
FIGS. 7(a), 7(b), and 7(c) are fragmentary enlarged views showing various shapes of cooling fan fins.
Figure 7B:
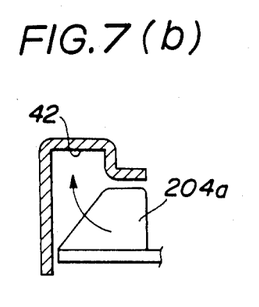
Figure 7C:
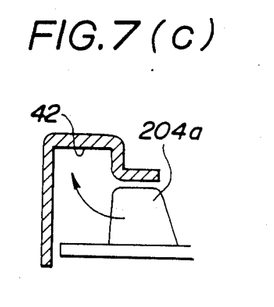

FIGS. 6(a) through 6(c) illustrate the cooling fan 204 and the cooling air guide 220. The cooling air guide 220 has a main portion 40, an air outlet portion 41, and an air flow guide passage 42. The main portion 40 is of a disc shape having an inside diameter $c_1$ slightly larger than the outside diameter of the cooling fan 204. The disc-shaped main portion 40 has a central axis coaxial with an axis 45 of rotation of the cooling fan 204 ($a_1 = b_1$). The air outlet portion 41 has an opening tangential to the disc-shaped main portion 40. In the illustrated embodiment, the opening of the air outlet portion 41 is directed toward the cylinder block 103 for blowing cooling air directly against the cylinder block 103. The air flow guide passage 42 serves to guide an air flow which has been formed by the cooling fan 204, spirally upwardly into the air outlet portion 41. The fins 204a of the cooling fan 204 each have an outer edge slightly curved downwardly from an inner side toward an outer side as shown in FIGS. 1 and 7(a) for producing a smooth air flow. Each fin 204a may be of an end shape extending obliquely in the air flow guide passage 42, as shown in FIG. 7(b), so that the cooling fan may be of an increased diameter and the amount of air flow can be increased. Alternatively, each fin 204a may not project into the air flow guide passage 42, as shown in FIG. 7(c), thereby increasing the volume of the scroll.

With the cooling fan 204 and the cooling air guide 220 thus constructed, the outside diameter of the guide 220 is slightly larger than the outside diameter of the cooling fan 204, and no additional air guide passage is defined which would project from the outer profile of the cooling fan 204. Therefore, the cooling fan system is of a reduced size, which results in a reduction of the size of the overall generator. Inasmuch as the cooling air guide 220 and the cooling fan 204 have shapes which are substantially symmetrical, as viewed in plan, and the central axis of the cooling air guide 220 is aligned with the axis 45 of rotation of the cooling fan 204, the center of gravity of the cooling air guide 220 may easily be placed at the geometric center of the generator, making the generator more stable and easier to operate. The cooling air guide passage 42 spirally rises progressively along the axis 45 of rotation of the cooling fan 204, so that cooling air can be smoothly led to the cylinder block 103 through a small area of projection of the cooling air guide passage 42. A lower outer wall of the crankcase 102 serves as a wall for the cooling air guide 220 particularly at a central portion thereof. Therefore, the cooling air guide 220 itself is not required to have a central upper wall below the crankcase 102.

In reference to FIG. 1, the portion or components of the engine-operated generator which are located on the left hand side of a vertical plane lying on the central axis of the crankshaft 104 is referred to as a colder side or unheated components, and a portion or components of the engine-operated generator which are located on the right hand side of the vertical plane is referred to as a hotter side or heated components.

Figure 8:
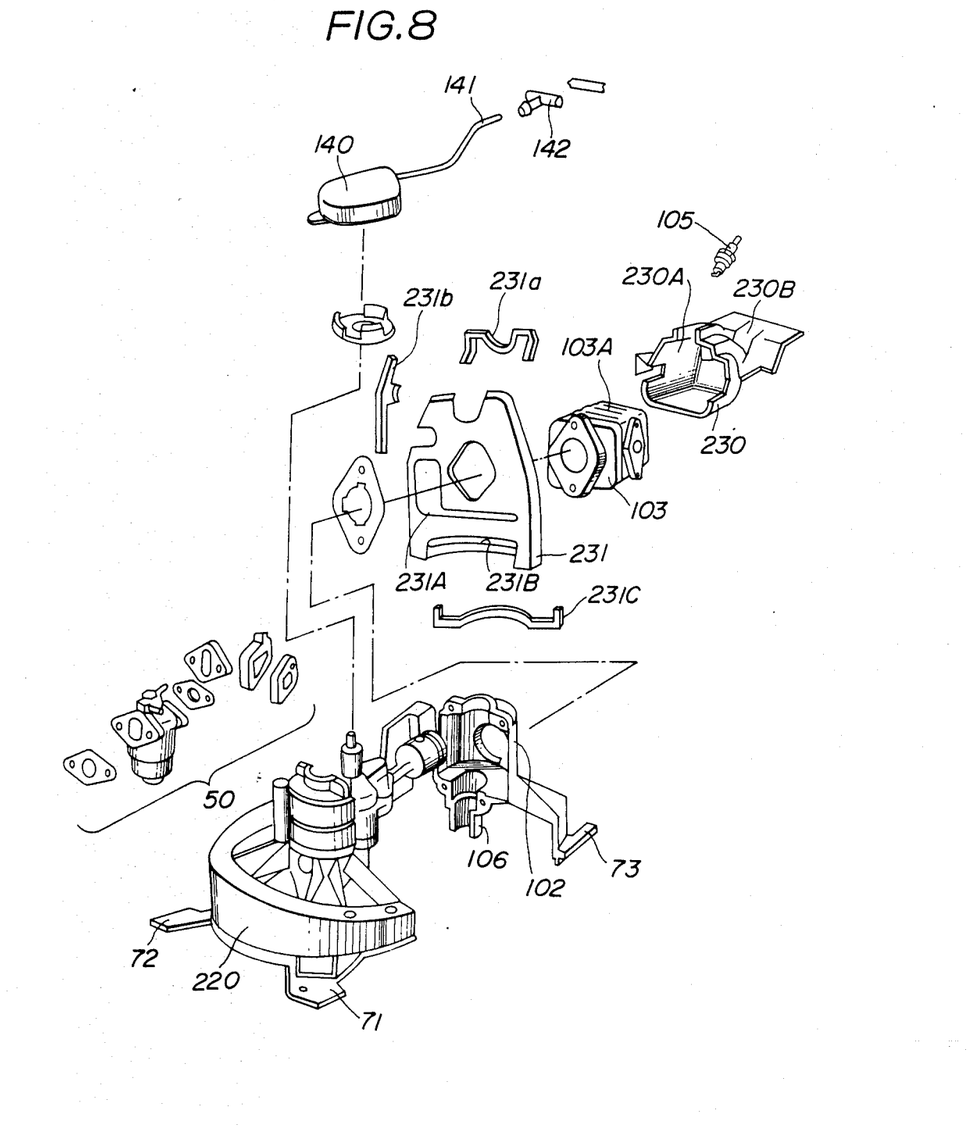
FIG. 8 is an exploded perspective view of the engine assembly, partitions surrounding the engine assembly, and the air cleaner unit.

FIG. 8 shows the engine assembly of the portable engine-operated electric generator as described above. The cylinder block 103 of the engine assembly is separated by the partitions 230, 231 from the colder side or unheated components, and the muffler 130 below the cylinder block 103 is also separated from the unheated components.

More specifically, the partitions 230, 231 are disposed around the crankcase 102 and the cylinder block 103. The partition 230 comprises a portion 230A defining a cooling space surrounding the cylinder block 103 and a plate-like portion 230B which separates the muffler unit 130 and the spark plug 105 from each other. The partition 231 is disposed where the crankcase 102 and the cylinder block 103 are joined and separates the unheated and heated components from each other. The partition 231 has an L-shaped slit 231A and a linear slit 231B below the L-shaped slit 231A. The slit 231A defines an air passage for passing therethrough air to cool the engine assembly, and the slit 231B defines an air passage for passing therethrough air to cool the muffler 130. The partition 231 is fixed in place in the case 300 by means of gaskets 231a, 231b, 231c. A carburetor 50 is positioned between the air cleaner 120 and the intake air manifold.

Figure 9:
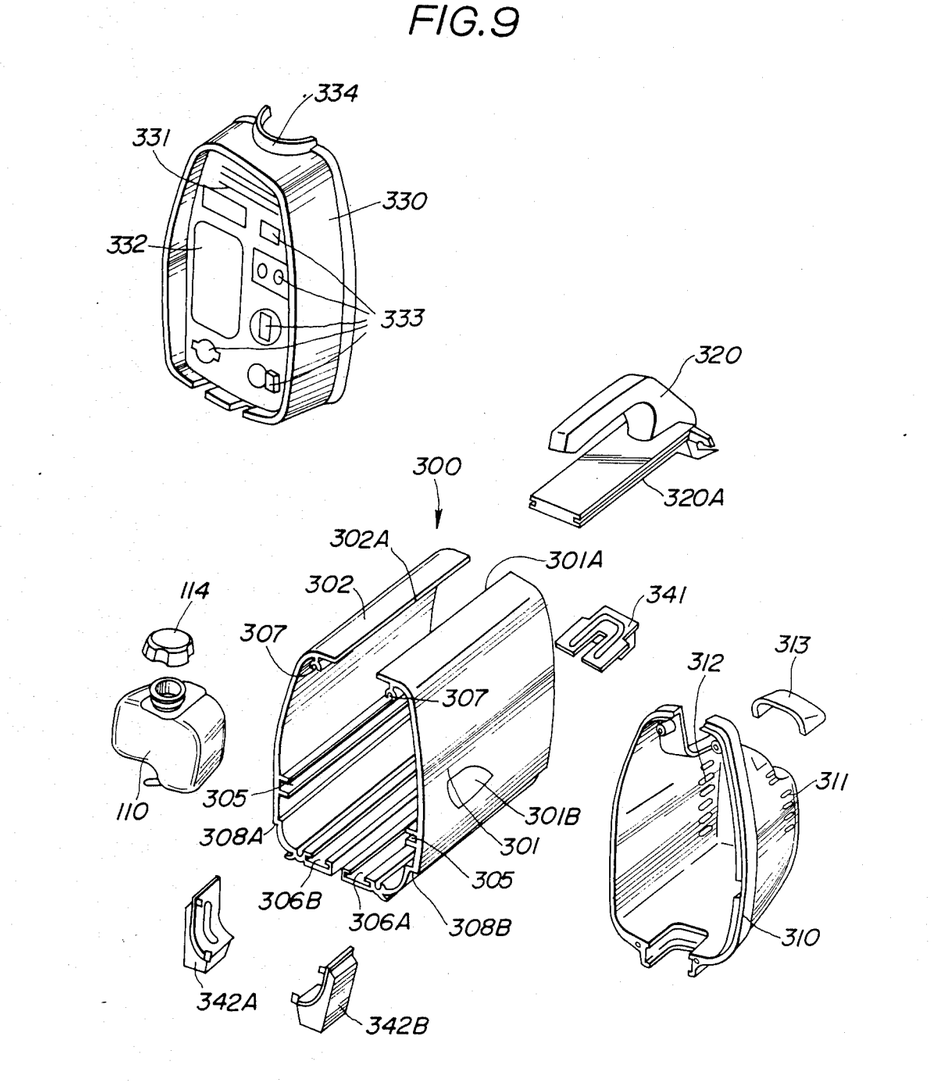
FIG. 9 is an exploded perspective view of the cover case.

FIG. 9 shows the cover case 300 in greater detail. The cover case 300 comprises two side panels 301, 302 extrusion-molded of aluminum, serving as a barrel portion, two end covers 310, 330 made of nylon 6 and fixed to the opposite ends of the side walls 301, 302, and a grip handle 320 of resin. Each of the side panels 301, 302 has on its inner central surface a retainer rail 305 for supporting the engine unit 100 and the generator unit 200 in the longitudinal direction of the side panel. Rails 306A, 306B are formed on lower ends, respectively, of the side panels 301, 302. A single leg 341 is fitted into one end of the rails 306A, 306B to join the lower ends of the two side panels 301, 302 to each other. The side panels 301, 302 have respective grooves 308A, 308B defined in outer lower surfaces, respectively, thereof. A pair of leg members 342A, 342B is fitted respectively in the grooves 308A, 308B to provide legs of the portable engine-operated electric generator. The side panels 301, 302 have upper confronting edges 301A, 302B which are slidably fitted respectively in opposite slots 320A defined in the opposite edges of a flat portion of the grip handle 320, which is thus secured to the upper ends of the side panels 301, 302. The side panel 301 has a switch recess 301B with a cooling air opening defined therein. The end cover 310 has cooling air outlet openings 311, 312. A cover member 313 is detachably attached to the end cover 310 for replacement of the spark plug 105. The grip handle 320 has a guide means for the recoil starter unit 140. The end cover 330 has a cooling air inlet opening 331, an air cleaner opening 332, and openings 333 for electric parts. The cooling air inlet opening 331 is defined in a position such that air introduced therethrough will hit the fuel tank 110 and be dispersed thereby into various portions in the generator device.

Cooling air flows in the directions of the thick arrows in FIG. 1 within the cover case 300 because of the presence of the various cooling air openings defined in the cover case 300. The fuel tank 110 and the partitions 230, 231 define an air passage labyrinth between the cooling air openings defined in the cover case 300 and the engine assembly 101, so that the sounds produced by the engine during operation thereof can be attenuated by such an air passage labyrinth. The sound attenuation ability is increased when the fuel tank 110 contains fuel since the filled fuel tank 110 is heavy and serves as a sound shield.

The cooling air flow is directed only from the colder or unheated components toward the hotter or heated components as shown in FIG. 1. Therefore, the cooling efficiency of cooling air is high. Since the heated components are located near the end cover 310, heat dispersion or dissipation after the engine has stopped takes place efficiently and easily. In addition, vapor lock is less likely to occur in the fuel supply system because the latter is positioned on the colder side.

The cylinder head 103 and the muffler 130 are positioned in the end cover 310. This allows spark plug replacement and other servicing to easily be effected simply by detaching the end cover 310 or the cover member 313. The unheated components can similarly be maintained and serviced quite easily by detaching the end cover 330.

The engine assembly 101 and the generator unit 200 can be placed into the cover case 300 in the following manner. First, the engine assembly 101 and the generator unit 200 are integrally joined to each other by fixing the rotor shaft 201 of the generator unit 200 to the crankshaft 104. The crankcase 102 has projecting legs or supported members 71, 72, 73 having a cross-sectional shape complementary to that of the retainer rails 305, as shown in FIG. 8. The projecting legs 71, 72, 73 are fitted into the retainer rails 305 through one of the open ends thereof, and then the engine assembly 101 and the generator unit 200 that are combined to each other are slid along the retainer rails 305 until a portion of the engine and generator combination (the distal end of the guide 220 of the generator unit 200) is brought into abutment with an engaging member 350 (see FIG. 3) on the end cover 310, whereupon the engine assembly 101 and the generator unit 200 are housed in position. Vibroisolating rubber caps 61, 62 are fitted over the legs 71, 72, 73 and clamped by the retainer rails 305. Reactive forces which would be produced on the generator unit 200 by rotation of the engine assembly 101 can be absorbed by the rubber caps 61, 62.

The present invention is not limited to the illustrated embodiment and modifications, but many other changes and modifications may be made and various members or components may be replaced with equivalent members and components by one of ordinary skill in the art. For example, the illustrated outer-rotor generator of the revolving field type may be replaced with a generator with a revolving armature. The recoil starter unit 140, the engine assembly 101, and the generator unit 200 may be differently arranged in their vertical order. While the generator unit 200 is shown as being directly coupled to the engine assembly 101, a speed reducer gear mechanism may be coupled between them to provide reduced rotation to the generator unit.

The present invention offers the following advantages:

(1) Since the output shaft of the engine assembly and the input shaft of the generator unit are interconnected in vertical axial alignment, and the components of the engine-operated generator are divided into unheated and heated components by a vertical imaginary plane, the portatable engine-operated generator has a better efficiency of heat radiation, can be conveniently maintained and serviced, and is small in size and light in weight.

(2) Because the generator unit is positioned below the engine assembly, and the muffler is disposed below the cylinder head and alongside of the generator unit in perpendicular relation to the crankshaft, the relatively heavy parts are located in the lower portion of the entire engine-operated generator device, resulting in a lower center of gravity and a compact arrangement. As the large-size outer-rotor generator is disposed below the engine assembly, operation of the generator device is stabilized by a so-called gyro effect. The lower center of gravity is also effective in achieving stable operation. The tendency of the generator device to creep due to vibration arising from rotation of the engine assembly is thus eliminated.

(3) Where the outer-rotor generator is employed, the stator can be arranged as a multipolar, multiphase configuration and the rotor can be rotated at a higher peripheral speed, so that the generator can produce an output higher than that of an inner-rotor generator at the same rotational speed. Therefore, the generator can be increased in radius and reduced in height. As a result, the rotor of the generator may be utilized as a flywheel, and the generator can generate a sufficient output even if the rotational speed is lowered, thus assuring a reduction in noise.

(4) Since the cooling fan is supported on the rotor disc of the generator for rotation therewith, the cooling fan can be easily installed in place, and the engine and the stator can be efficiently cooled. The fins of the cooling fan extend from the outer periphery to the inner periphery of the outer rotor, so that the gap between the rotor and the stator, and the winding can be effectively cooled. In the disclosed embodiments of the invention, the cooling fan is provided with the air director, the partitions, and the cooling air guide for more effective cooling. The cooling fan is fixed to the outer peripheral portion of the rotor, thereby achieving effective utilization of a space for the bearing. This contributes to a reduction in the size of the portable engine-operated electric generator.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A portable engine-operated electric generator comprising:
   a sound proof case having a plurality of air inlet openings at its front and a plurality of air outlet openings at its rear;
   an engine supported within said case, said engine including a crankcase having a vertically extending output shaft and a cylinder block extending rearwardly and horizontally from said crankcase;
   a generator unit disposed below said engine and having a vertically extending input shaft, said input shaft being coaxially connected to the output shaft of said engine; and
   heated and unheated components all housed within said case, said unheated components being situated forwardly of a nominal vertical plane that extends transversely of the soundproof case and includes a longitudinal axis of said output shaft of the engine, and said heated components being situated rearwardly of said nominal vertical plane.

2. A portable engine-operated electric generator according to claim 1, wherein said heated components include a cylinder block and an exhaust muffler of said engine, and said unheated components include a fuel tank, a carburetor, and an air cleaner.

3. A portable engine-operated electric generator according to claim 2, further including a partition disposed around an area in which said cylinder block and said crankcase are joined to each other, said partition isolating said heated components from said unheated components.

4. A portable engine-operated electric generator according to claim 1, wherein said generator unit is a generator having an outer rotor.

5. A portable engine-operated electric generator according to claim 1, said generator further including an exhaust muffler connected to said engine and disposed between said engine and said generator unit and said inner wall of the soundproof case, said exhaust muffler extending transversely of the case and having a longitudinal axis extending in a direction normal to the output shaft of said engine.

6. A portable engine-operated electric generator according to claim 5, wherein said muffler is disposed downwardly of said cylinder block and along side of said generator unit.

7. A portable engine-operated electric generator according to claim 5, wherein said generator unit is a generator having an outer rotor.

8. A portable engine-operated electric generator comprising:
   an engine having an output shaft;
   a generator unit drivable by said engine, said generator unit comprising an outer-rotor generator including a stator and a rotor including an outer cylindrical portion surrounding said stator;
   said rotor being supported on said output shaft of the engine at one end of said cylindrical portion remote from said engine; and
   a cooling fan disposed between said engine and said generator, said cooling fan having a plurality of fins supported on an end of said cylindrical portion and having raised surfaces extending radially inwardly from said cylindrical portion and at an angle to a plane of rotation of said rotor.

9. A portable engine-operated electric generator according to claim 8, wherein said cooling fan has, in an intermediate portion thereof, an air director for drawing air from said engine and said generator unit.

10. A portable engine-operated electric generator according to claim 8, wherein said engine and said generator unit are vertically arranged.

11. A portable engine-operated electric generator comprising:
   an engine having an output shaft;

a generator unit having an input shaft and drivable by said engine;

said output shaft of the engine and said input shaft of the generator unit having one axis;

a cooling fan disposed between said engine and said generator unit, said cooling fan having a center of rotation on said axis and including an air guide; and said air guide comprising a cylindrical main portion supported on said axis, an air outlet portion displaced from said main portion along said axis and opening tangentially to said main portion, and an air guide portion communicating between said air output portion and said main portion, said air guide portion being of a spiral shape.

12. A portable engine-operated electric generator according to claim 11, wherein said generator unit comprises an outer-rotor generator including a stator and a rotor having an outer cylindrical portion surrounding said stator.

13. A portable engine-operated electric generator according to claim 12, wherein said cooling fan is supported on said rotor.

* * * * *

UNITED STATES PATENT AND TRADEMARK OFFICE
CERTIFICATE OF CORRECTION

PATENT NO. : 4,859,886

DATED : Aug. 22, 1989

INVENTOR(S) : Tanaka et al

It is certified that error appears in the above-identified patent and that said Letters Patent is hereby corrected as shown below:

Column 1, line 15, after "insulation" delete "for engine sounds".

Column 3, line 10, after "FIG. 3 is" insert --a--.

Signed and Sealed this

Fifteenth Day of January, 1991

Attest:

HARRY F. MANBECK, JR.

Attesting Officer    Commissioner of Patents and Trademarks